United States Patent
Specht

(10) Patent No.: US 7,950,352 B2
(45) Date of Patent: May 31, 2011

(54) PET TOY

(75) Inventor: Paul B. Specht, Wilmette, IL (US)

(73) Assignee: SJ Assets, LLC, Evanston, IL (US)

( * ) Notice: Subject to any disclaimer, the term of this patent is extended or adjusted under 35 U.S.C. 154(b) by 0 days.

(21) Appl. No.: 12/549,215

(22) Filed: Aug. 27, 2009

(65) Prior Publication Data

US 2011/0048338 A1  Mar. 3, 2011

(51) Int. Cl.
*A01K 29/00* (2006.01)
*A63H 3/28* (2006.01)

(52) U.S. Cl. .................................. 119/707; 446/184

(58) Field of Classification Search .................. 119/707, 119/702, 708; 446/184, 185, 188
See application file for complete search history.

(56) References Cited

U.S. PATENT DOCUMENTS

| | | | |
|---|---|---|---|
| 754,148 A | 3/1904 | Kuhlemann | |
| 1,187,838 A * | 6/1916 | Hughes | 473/571 |
| 1,595,441 A * | 8/1926 | Zenger | 473/571 |
| 1,668,785 A | 5/1928 | Smart | |
| 2,714,275 A | 8/1955 | Proll | |
| 2,739,352 A | 3/1956 | Watson | |
| 3,075,317 A | 1/1963 | Craft | |
| 3,702,038 A | 11/1972 | Hakim | |
| RE29,050 E | 11/1976 | Hakim | |
| 4,253,254 A * | 3/1981 | Gill | 36/139 |
| 4,802,444 A | 2/1989 | Markham et al. | |
| D307,339 S | 4/1990 | Markham et al. | |
| 4,915,660 A | 4/1990 | Overholt, Sr. | |
| D308,122 S | 5/1990 | Markham et al. | |
| 4,936,809 A * | 6/1990 | Auer et al. | 446/184 |
| D317,805 S | 6/1991 | Swan | |
| D326,362 S | 5/1992 | Bertwell | |
| D326,562 S | 6/1992 | Bertwell | |
| 5,222,903 A | 6/1993 | Parrott et al. | |
| D344,161 S | 2/1994 | Markham | |
| D349,786 S | 8/1994 | Markham | |
| D356,685 S | 3/1995 | Bertwell | |
| 5,485,807 A | 1/1996 | Bertwell et al. | |
| D373,859 S | 9/1996 | Markham et al. | |
| 5,640,931 A | 6/1997 | Markham | |
| D387,513 S | 12/1997 | Mauldin, Jr. | |
| D388,559 S | 12/1997 | Mauldin, Jr. | |

(Continued)

OTHER PUBLICATIONS

Photographs of Replacement Squeakers from Kong Company, 16191 Table Mountain Parkway, Golden, Colorado, www.kongcompany.com, ©2008.

(Continued)

*Primary Examiner* — Yvonne R. Abbott
(74) *Attorney, Agent, or Firm* — Leydig, Voit & Mayer, Ltd.

(57) ABSTRACT

A pet toy may include an outer covering and a bladder assembly. The bladder assembly may include a bladder and a squeaker assembly. The squeaker assembly may include one or more ribs. The bladder may include a body and a neck. The neck may have one or more grooves. A rib may engage a groove. The engagement of the rib with the groove may prevent the squeaker assembly from exiting the opening of the bladder when the bladder is compressed. The body of the bladder may have a shape which allows the body to return to the uncompressed state after the body has been compressed. The body may be made of a material which allows the body to return to the uncompressed state after the body has been compressed.

36 Claims, 15 Drawing Sheets

U.S. PATENT DOCUMENTS

| | | | |
|---|---|---|---|
| 5,813,366 A | 9/1998 | Mauldin, Jr. | |
| 5,832,877 A | 11/1998 | Markham | |
| 5,865,146 A | 2/1999 | Markham | |
| 5,904,118 A | 5/1999 | Markham | |
| 5,910,039 A | 6/1999 | Primos et al. | |
| 5,947,061 A | 9/1999 | Markham et al. | |
| D420,056 S | 2/2000 | Mauldin, Jr. | |
| 6,148,771 A | 11/2000 | Costello | |
| 6,331,131 B1 * | 12/2001 | Selevan | 446/220 |
| 6,427,634 B1 | 8/2002 | Mann | |
| 6,439,166 B1 | 8/2002 | Markham | |
| 6,470,830 B2 | 10/2002 | Mann | |
| 6,609,944 B1 * | 8/2003 | Viola | 446/409 |
| 6,786,792 B2 | 9/2004 | Ritchey | |
| 6,892,674 B1 | 5/2005 | Dubinins et al. | |
| 6,935,274 B1 * | 8/2005 | Rothschild | 119/702 |
| 7,066,779 B2 * | 6/2006 | Willinger | 446/188 |
| 7,144,293 B2 * | 12/2006 | Mann et al. | 446/184 |
| RE39,563 E | 4/2007 | Markham | |
| 7,201,117 B2 | 4/2007 | Ritchey et al. | |
| 7,234,420 B1 | 6/2007 | Tsengas | |
| 7,264,533 B2 | 9/2007 | Chan et al. | |
| 7,343,878 B2 | 3/2008 | Ritchey et al. | |
| 7,357,421 B2 | 4/2008 | Locker et al. | |
| 7,363,880 B2 | 4/2008 | Ritchey et al. | |
| 7,455,033 B2 | 11/2008 | Curry | |
| 7,597,065 B2 * | 10/2009 | Jager | 119/709 |
| 7,736,213 B2 * | 6/2010 | Willinger et al. | 446/184 |
| 2002/0129774 A1 * | 9/2002 | Strongin | 119/707 |
| 2004/0083983 A1 | 5/2004 | Markham | |
| 2004/0224053 A1 | 11/2004 | Markham et al. | |
| 2004/0224063 A1 | 11/2004 | Markham et al. | |
| 2005/0136790 A1 * | 6/2005 | Hall et al. | 446/202 |
| 2006/0121822 A1 * | 6/2006 | Willinger et al. | 446/184 |
| 2006/0134278 A1 | 6/2006 | Miller | |
| 2007/0062461 A1 * | 3/2007 | Lubeck | 119/709 |
| 2007/0283900 A1 | 12/2007 | Jager | |
| 2007/0295283 A1 | 12/2007 | Gick | |
| 2008/0064292 A1 | 3/2008 | Willinger et al. | |
| 2009/0266306 A1 * | 10/2009 | Edwards et al. | 119/709 |
| 2010/0041302 A1 * | 2/2010 | Rutherford et al. | 446/188 |

OTHER PUBLICATIONS

Photographs of Air Dog Squeaker Ball, available on May 6, 2009.

Notification of Transmittal of the International Search Report and the Written Opinion of the International Searching Authority, including the International Search Report and the Written Opinion for International Application PCT/US2010/046779.

* cited by examiner

PET TOY

BACKGROUND

Various animals, especially dogs, like to chew on items, such as, pet toys. A pet toy may include a squeaker which makes a noise when the animal bites on the pet toy. The squeaker may fail for several reasons. For example, the squeaker assembly may become separated from the bladder. As another example, the bladder may not return to the uncompressed state after the bladder has been compressed.

BRIEF SUMMARY

A pet toy may include an outer covering and a bladder assembly. The bladder assembly may include a bladder and a squeaker assembly. The squeaker assembly may include one or more ribs. The bladder may include a body and a neck. The neck may include an opening for the squeaker assembly. The neck may have one or more grooves. A rib may engage a groove. The engagement of the rib with the groove may prevent the squeaker assembly from exiting the opening of the bladder when the bladder is compressed.

The body of the bladder may have a shape which allows the body to return to the uncompressed state after the body has been compressed. For example, the body may have a spherical shape. The body may be made of a material which allows the body to return to the uncompressed state. For example, the body may include urethane.

The squeaker assembly may include a barrel, a reed, a reed collar, and a platform. The reed vibrates with respect to the platform as air exits and enters the barrel in order to make the squeaking sound.

DESCRIPTION

Figure 1:
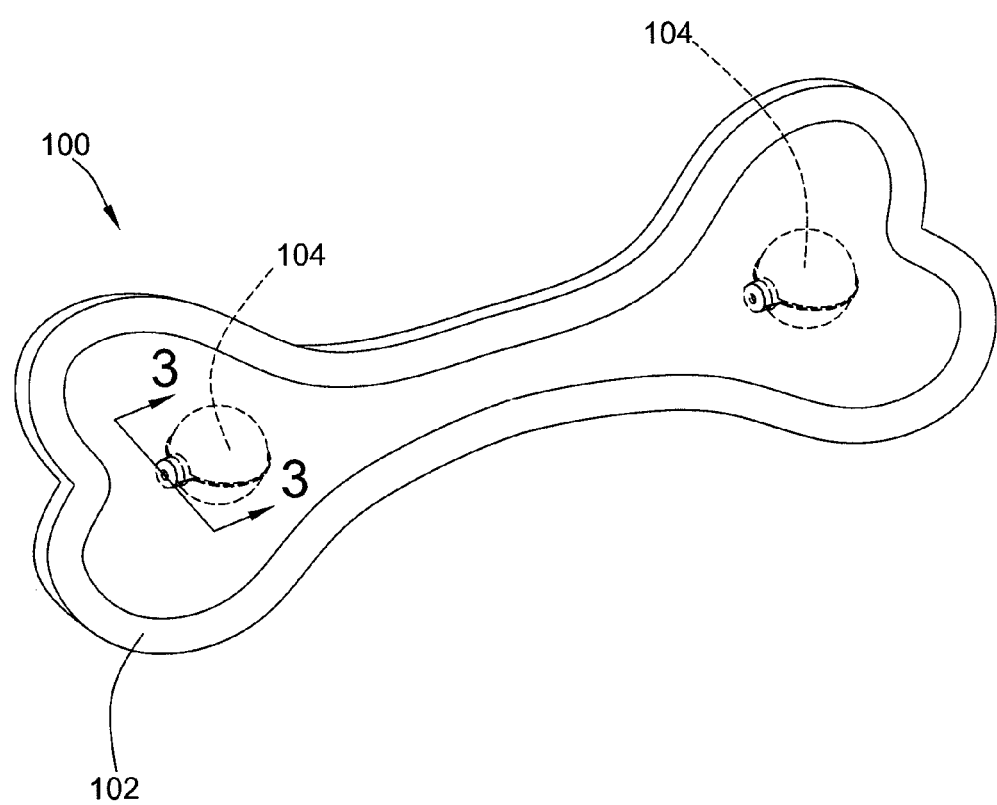
FIG. 1 is a perspective view of a pet toy with a bladder assembly.

Referring to FIG. 1, a pet toy 100 may include an outer covering 102 and a bladder assembly 104. The outer covering 102 may be in the shape of a bone. In other embodiments, the outer covering may have another shape, such as, a ball, a disc, a boomerang, a tug, a ring, a duck, a pheasant, or a man. The outer covering may be made of polyester or nylon. The outer covering may be made of layers of material, such as, a first layer of polyester or nylon, and a second layer of polyester or nylon.

Figure 2:
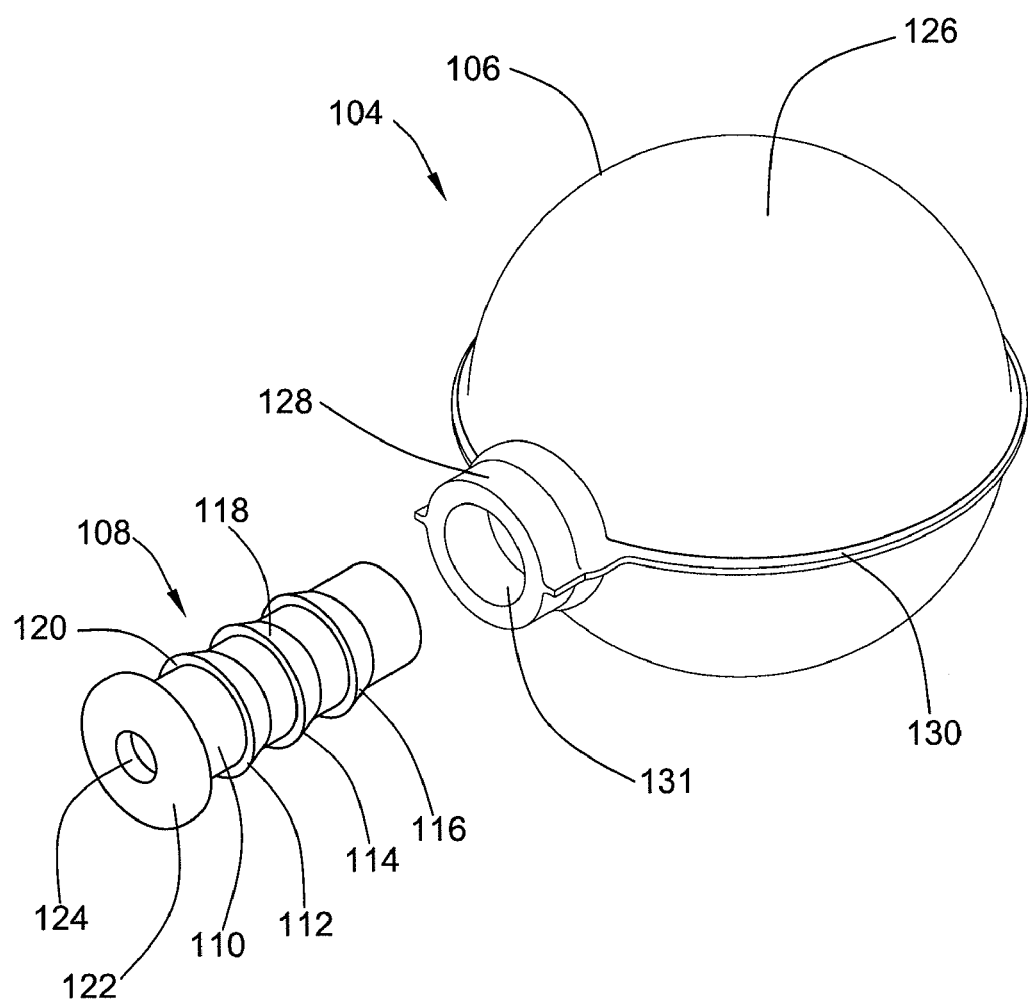
FIG. 2 is an exploded view of a bladder assembly.

Referring to FIG. 2, the bladder assembly 104 may include a bladder 106 and a squeaker assembly 108. The squeaker assembly 108 may have a surface 110. The surface 110 may include one or more ribs 112, 114, 116. The ribs may extend outward from the surface 110. The ribs may have a barb shape or triangle shape. The ribs may have a sloped surface 118 and a vertical surface 120. In other embodiments, the ribs may have another shape, such as, a hemispherical shape, a rounded shape, a curved shape, or a rectangular shape. The ribs may extend around the surface 110. In other embodiments, the ribs may extend intermittently around the surface.

The squeaker assembly 108 may include a stop 122. The stop 122 may extend outward from the surface 110. The squeaker assembly 108 may include an opening 124. The opening 124 may allow air to enter and exit the squeaker assembly. In one embodiment, the opening 124 may be circular. In other embodiments, the opening may have other shapes, such as, a square, a rectangle, other polygons, other shapes, or may consist of a plurality of small holes or shaped apertures.

Referring to FIG. 2, the bladder 106 may include a body 126 and a neck 128. The body 126 may be in the shape of a sphere. In other embodiments, the body may have other shapes, such as, an oblate spheroid. However, when certain shapes are compressed in a specific direction, certain shapes may not return to the uncompressed state. For example, when the body has the shape of an oblate spheroid, such as, the shape in FIGS. 13-15, and the body is compressed along the seam, the body may not return to the uncompressed state. When the body does not return to the uncompressed state, the length and/or intensity of the squeaker noise may be reduced or eliminated. Referring to FIG. 2, the spherical shape may allow the body to return to the uncompressed state. For example, the body may return to the uncompressed state even if the body is compressed along a seam 130.

The neck 128 may extend outward from the body 126. The neck 128 may include an opening 131 for the squeaker assembly 108.

The bladder 106 may be made of urethane. In other embodiments, the bladder may be made from the following materials: polypropylene (PP), low density polypropylene (LDPP), polyvinyl chloride (PVC), elastomers, or a combination thereof. The material may assist the body 126 in returning to the uncompressed state. For example, a body made of a urethane material may return to the uncompressed state better than a body made of polypropylene ethylene.

The material for the bladder may have a durometer in a first range from about 30 to about 70, in a second range from about 45 to about 65, and in a third range from about 40 to about 55. In one embodiment, the durometer may be 50. The durometer is per ASTM D2240-00 Testing Standard A Scale. The durometer of the material may assist the body 126 in returning to the uncompressed state.

The bladder 106 may be made by a vacuum forming process. A sheet of material may be vacuum formed to create half portions of the bladder. The half portions may be joined to form the bladder. The half portions may be joined by an adhesive, ultrasonic welding, or heat welding. In other embodiments, the bladder may be made by one of the following processes: injection molding, or injection blow molding.

Depending upon the manufacturing process, the bladder may have a seam 130. In other embodiments, the bladder may not have a seam 130, such as, the embodiment shown in FIG. 7.

Figure 3:
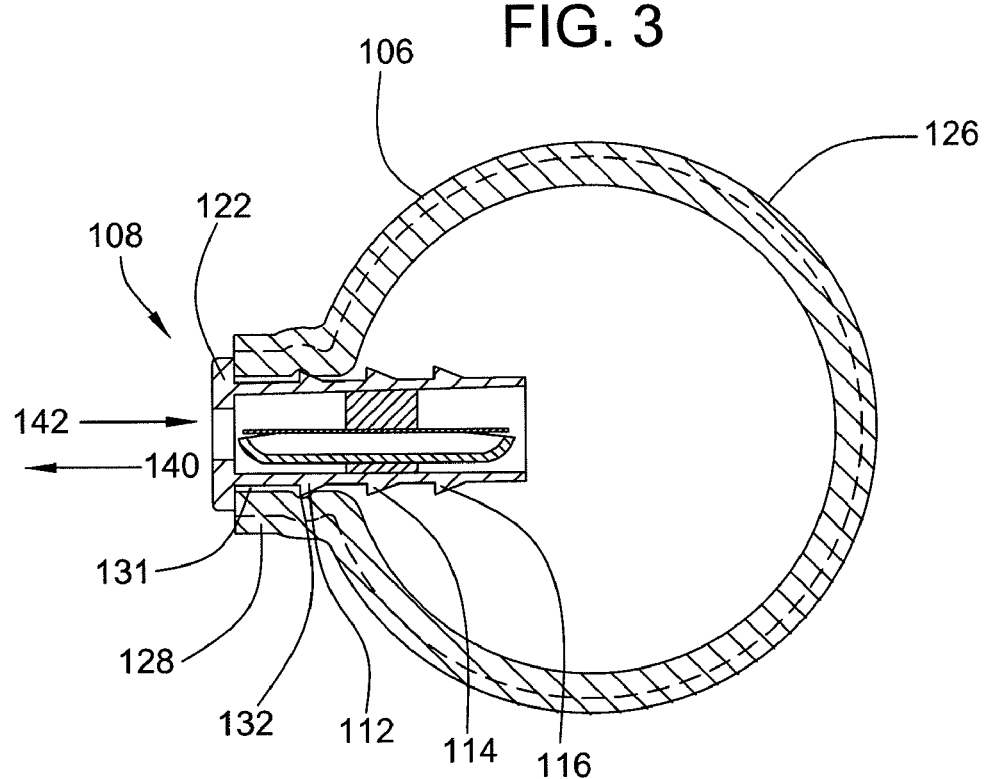
FIG. 3 is a cross-sectional view of a bladder assembly taken along line 3-3 in FIG. 1.

Referring to FIG. 3, the neck 128 may have a groove 132. The rib 112 may engage the groove 132. The engagement of the rib 112 with the groove 132 may prevent the squeaker assembly 108 from exiting the opening 131 of the bladder 106 in the direction 140 when the bladder 106 is compressed. If the rib 112 did disengage the groove 132, the rib 114 may engage the groove 132 to prevent the squeaker assembly 108 from exiting the opening 131 in the direction 140 when the bladder 106 is compressed. If the rib 114 did disengage the groove 132, the rib 116 may engage the groove 132 to prevent the squeaker assembly 108 from exiting the opening 131 in the direction 140 when the bladder 106 is compressed.

Figure 4:
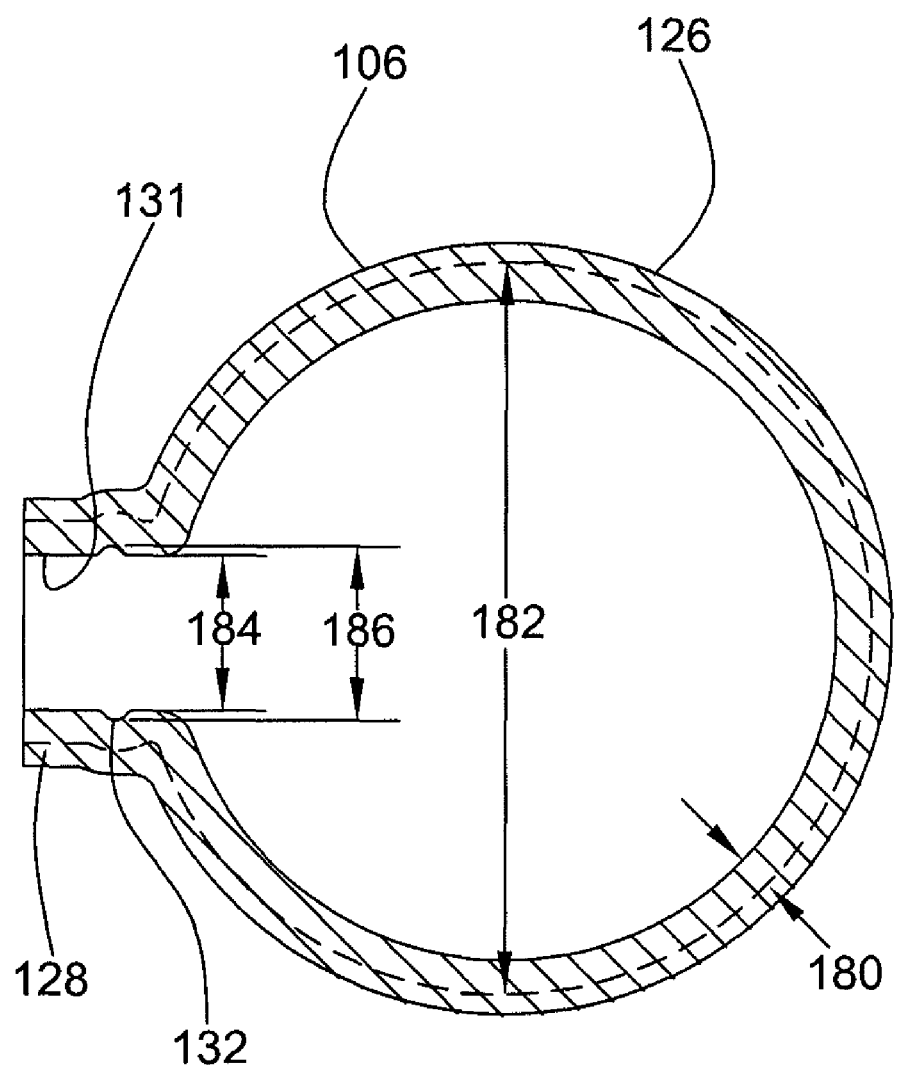
FIG. 4 is a cross-sectional view of a bladder.

The ribs 112, 114, 116 may be shaped so that the ribs may facilitate the insertion of the squeaker assembly 108 into the opening 131 and may resist the removal of the squeaker assembly 108 from the opening 131. Referring to FIGS. 2 and 4, in one embodiment, the ribs 112, 114, 116 may have a sloped surface 118 which may facilitate the insertion of the squeaker assembly 108. In one embodiment, the ribs 112, 114, 116 may have a vertical surface 120 which may prevent the removal of the squeaker assembly 108.

Referring to FIGS. 3 and 4, the groove 132 may have a curved shape. In other embodiments, the groove may have another shape, such as, a hemi-spherical shape, a rounded shape, a triangular shape, a rectangular shape. The groove may have a shape which may facilitate the insertion of the squeaker assembly 108. The groove may have a shape which may resist the removal of the squeaker assembly 108. In other embodiments, the shape of the groove may correspond to the shape of the rib.

Referring to FIG. 3, the squeaker assembly 108 may include a stop 122. The stop 122 may engage the bladder 106. The stop 122 may prevent the over insertion of the squeaker assembly 108 during manufacture. The stop 122 may prevent the squeaker assembly 108 from exiting the opening 131 and entering the body 126 in the direction 142 when the bladder inflates after being compressed. In one embodiment, the stop 122 may have a rectangular shape with a rounded corner. In other embodiments, the stop may have other shapes, such as, a triangular shape, a hemispherical shape, a rounded shape, or a curved shape.

Figure 5:
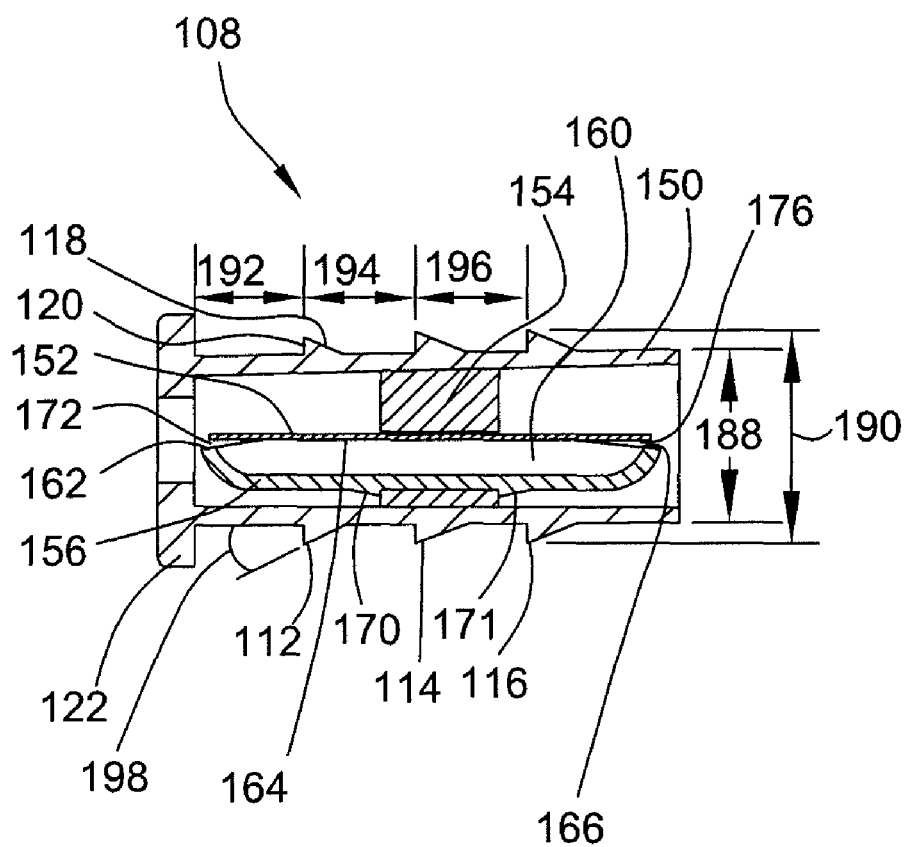
FIG. 5 is a cross-sectional view of a squeaker assembly.
Figure 6:
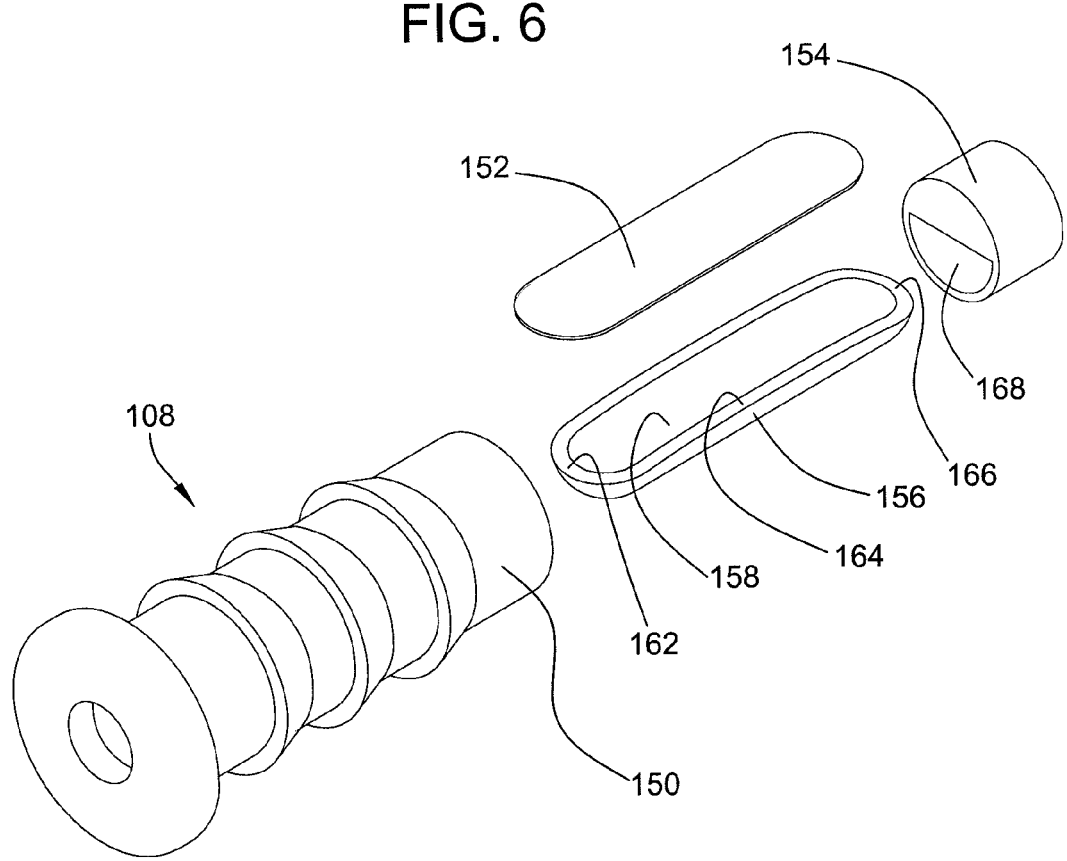
FIG. 6 is an exploded view of a squeaker assembly.

Referring to FIG. 6, the squeaker assembly 108 may include a barrel 150, a reed 152, a reed collar 154, and a platform 156. The platform 156 may have a depression 158 which may be below the upper surface 160 of the platform. The front portion 162 of the upper surface 160 may be lower than the middle portion 164 of the upper surface 160 as shown in FIGS. 5 and 6. The rear portion 166 of the upper surface 160 may be lower than the middle portion 164 of the upper surface 160 as shown in FIGS. 5 and 6.

Figure 7:
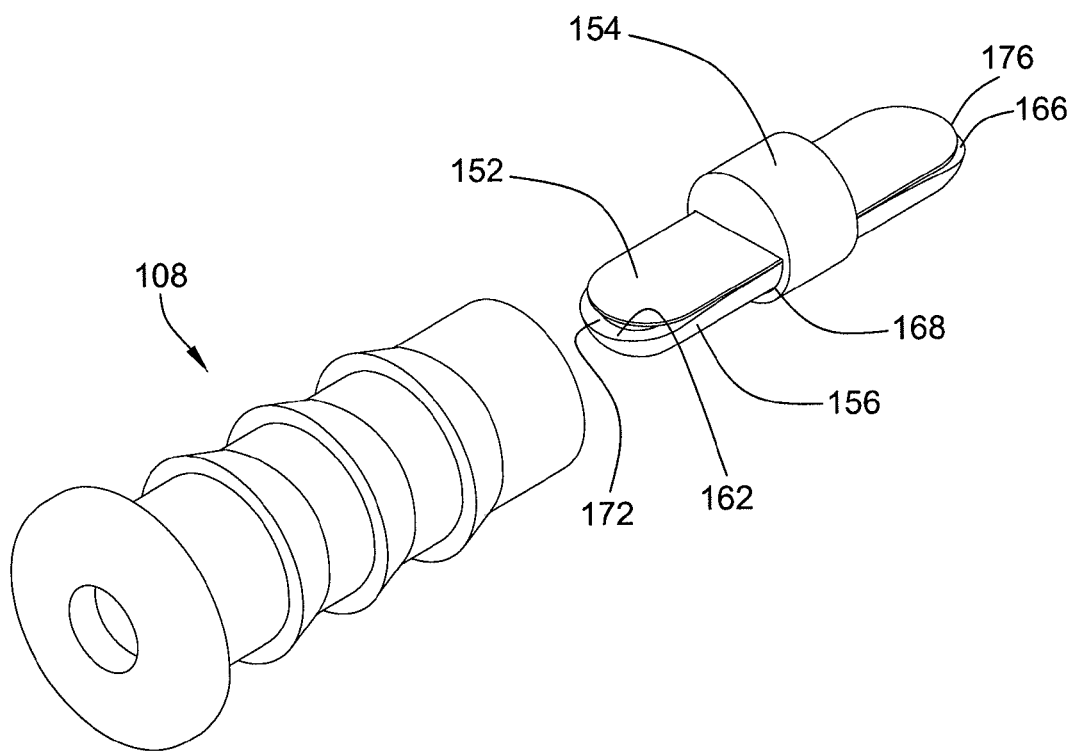
FIG. 7 is an exploded view of a squeaker assembly.
Figure 8:
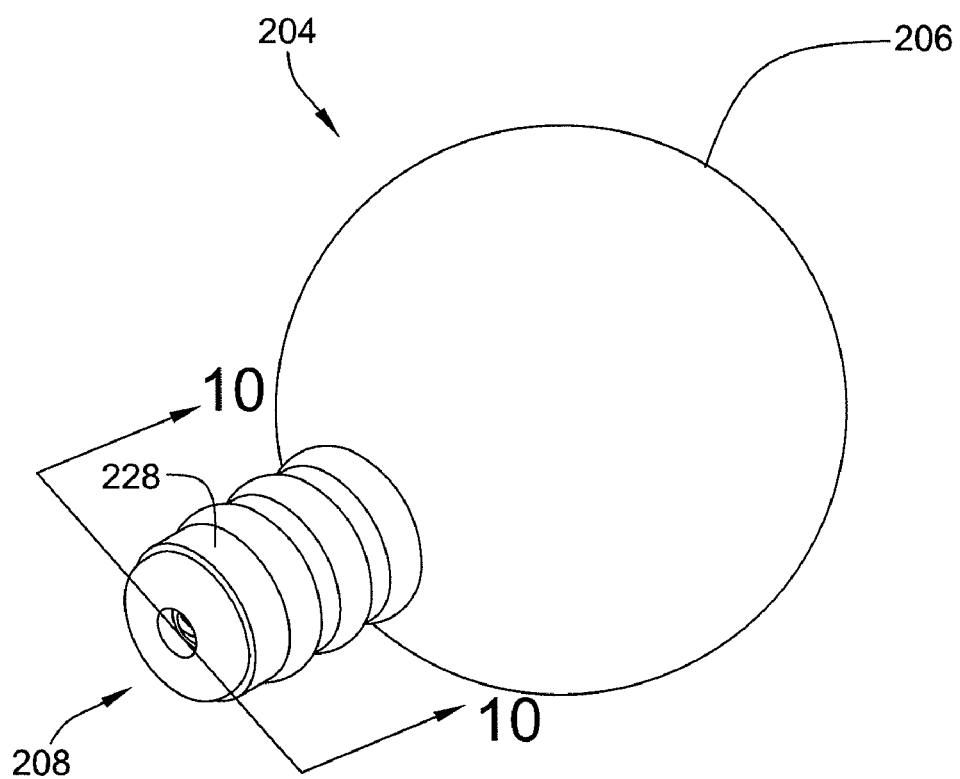
FIG. 8 is a perspective view of another embodiment of a bladder assembly.
Figure 9:
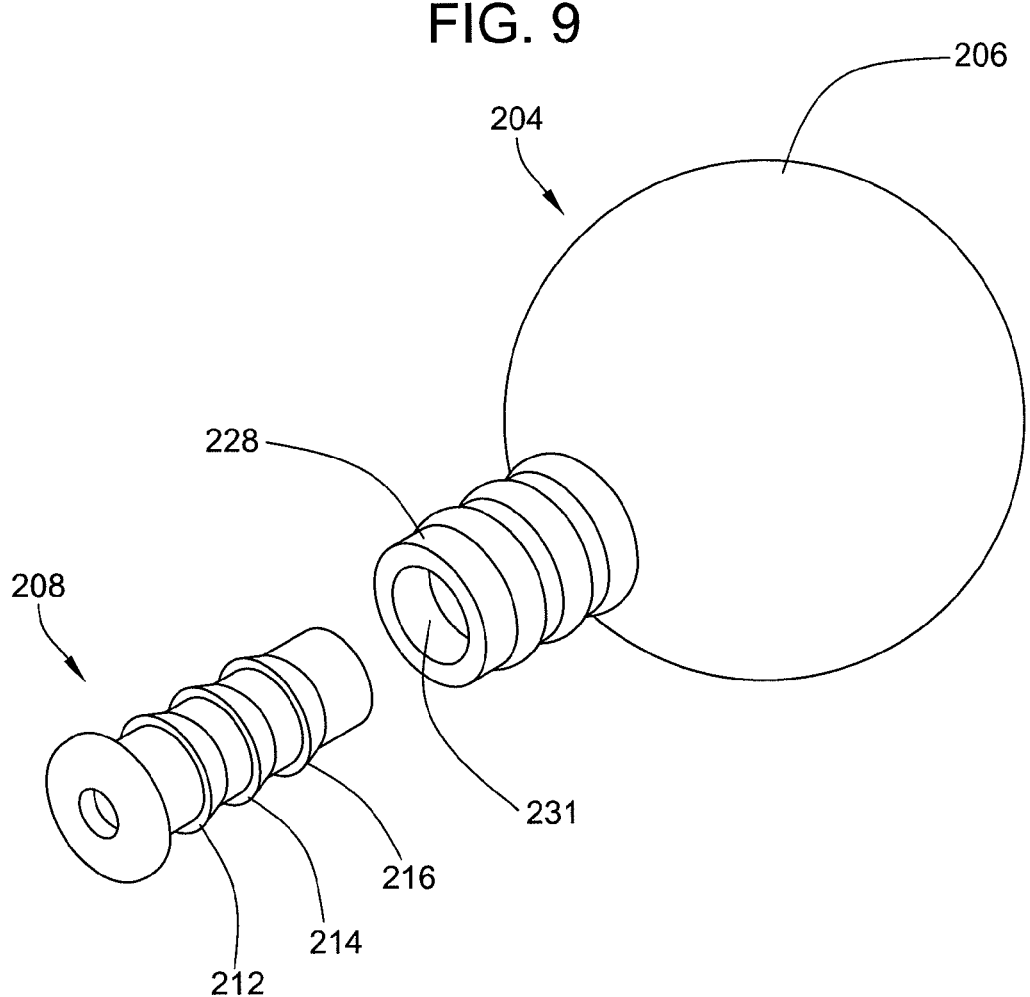
FIG. 9 is an exploded view of the bladder assembly in FIG. 8.

Referring to FIG. 7, the reed 152 and the platform 156 are inserted into an aperture 168 in the collar 154. Referring to FIG. 6, the aperture 168 may have a semi-circular shape. Referring to FIG. 5, the platform 156 may have stops 170, 171. The stops 170, 171 may assist in retaining the collar 154 onto the platform 156. The stops 170, 171 may have a triangular shape. In other embodiments, the stops may have other shapes, such as, a hemispherical shape, a rounded shape, a curved shape, or a rectangular shape. The stops 170, 171 may be the same size and/or shape or the stop 170 may have a different size and/or shape than the stop 171.

Referring to FIG. 5, the assembly, which includes the reed 152, the collar 154, and the platform 156, are inserted into the barrel 150. Referring to FIG. 3, the barrel 150 is inserted into the opening 131 in the bladder 106.

Referring to FIG. 5, the reed 152 vibrates with respect to the platform 156 as air exits and enters the barrel 150 in order to make the squeaking sound. Referring to FIGS. 5 and 7, a front gap 172 may be created between the reed 152 and the front portion 162 of the platform. The front gap 172 allows air to pass between the reed 152 and the platform 156. A rear gap 176 may be created between the reed 152 and the rear portion 166 of the platform. The rear gap 176 allows air to pass between the reed 152 and the platform 156. The reed 152 vibrates as the air moves past the reed 152.

In other embodiments, the bladder assembly may use another squeaker assembly, such as, an electronic squeaker assembly.

Referring to FIG. 4, the body 126 may have a wall thickness 180. The wall thickness 180 may have a first range from about 0.025 inches (0.064 cm) to about 0.08 inches (0.2 cm), a second range from about 0.03 inches (0.08 cm) to about 0.065 inches (0.17 cm), and a third range from about 0.02 inches (0.05 cm) to about 0.055 inches (0.14 cm). In the first embodiment, the wall thickness 180 may be 0.05 inches (0.13 cm). In a second embodiment, the wall thickness 180 may be 0.06 inches (0.15 cm).

The body 126 may have a distance 182. The distance 182 may have a first range from about 0.7 inches (1.78 cm) to about 1.5 inches (3.81 cm), a second range from about 0.8 inches (2.03 cm) to about 1.4 inches (3.56 cm), and a third range from about 0.85 inches (2.16 cm) to about 0.95 inches (2.41 cm). In a first embodiment, the distance 182 may be 0.9 inches (2.29 cm). In a second embodiment, the distance 182 may be 0.92 inches (2.34 cm).

The opening 131 in the neck may have a distance 184. The distance 184 may have a first range from about 0.175 inches (0.44 cm) to about 0.23 inches (0.58 cm), a second range from about 0.18 inches (0.46 cm) to about 0.225 inches (0.57 cm), and a third range from about 0.195 inches (0.50 cm) to about 0.22 inches (0.56 cm). In a first embodiment, the distance 184 may be 0.198 inches (0.5 cm). In a second embodiment, the distance 184 may be 0.2 inches (0.51 cm).

The groove 132 may have a distance 186. The distance 186 may have a first range from about 0.19 inches (0.48 cm) to about 0.24 inches (0.61 cm), a second range from about 0.2 inches (0.51 cm) to about 0.23 inches (0.58 cm), and a third range from about 0.021 inches (0.53 cm) to about 0.222 inches (0.56 cm). In a first embodiment, the distance 186 may be 0.21 inches (0.53 cm). In a second embodiment, the distance 186 may be 0.22 inches (0.56 cm).

Referring to FIG. 5, the barrel 150 may have a distance 188. The distance 188 may have a first range from about 0.17 inches (0.43 cm) to about 0.22 inches (0.56 cm), a second range from about 0.18 inches (0.46 cm) to about 0.21 inches (0.53 cm), and a third range from about 0.2 inches (0.51 cm) to about 0.205 inches (0.52 cm). In a first embodiment, the distance 188 may be 0.2 inches (0.51 cm). In a second embodiment, the distance 188 may be 0.205 inches (0.52 cm).

The ribs 112, 114, 116 may have a distance 190. The distance 190 may have a first range from about 0.19 inches (0.48 cm) to about 0.27 inches (0.69 cm), a second range from about 0.21 inches (0.53 cm) to about 0.26 inches (0.66 cm), and a third range from about 0.22 inches (0.56 cm) to about 0.25 inches (0.64 cm). In a first embodiment, the distance 190 may be 0.22 inches (0.56 cm). In a second embodiment, the distance 190 may be 0.25 inches (0.64 cm).

The rib 112 may be located at a distance 192. The distance 192 may have a first range from about 0.12 inches (0.30 cm) to about 0.15 inches (0.38 cm), a second range from about 0.125 inches (0.32 cm) to about 0.142 inches (0.36 cm), and a third range from about 0.13 inches (0.33 cm) to about 0.135 inches (0.34 cm). In a first embodiment, the distance 192 may be 0.13 inches (0.33 cm). In a second embodiment, the distance 192 may be 0.133 inches (0.34 cm). The rib 114 may be located a distance 194. The distance 194 may have the same dimensional information as distance 192. The rib 116 may be located a distance 196. The distance 196 may have the same dimensional information as distance 192. In one embodiment, the distances 194, 196 may be the same as distance 192. In another embodiment, two or more of the distances 192, 194, 196 may be different.

The ribs 112, 114, 116 may have an angle 198. The angle 198 may have a first range from about 10 degrees to about 25 degrees, a second range from about 8 degrees to about 20 degrees, and a third range from about 6 degrees to about 15 degrees. In a first embodiment, the angle 198 may be 15 degrees. In a second embodiment, the angle 198 may be 12 degrees.

Figure 10:
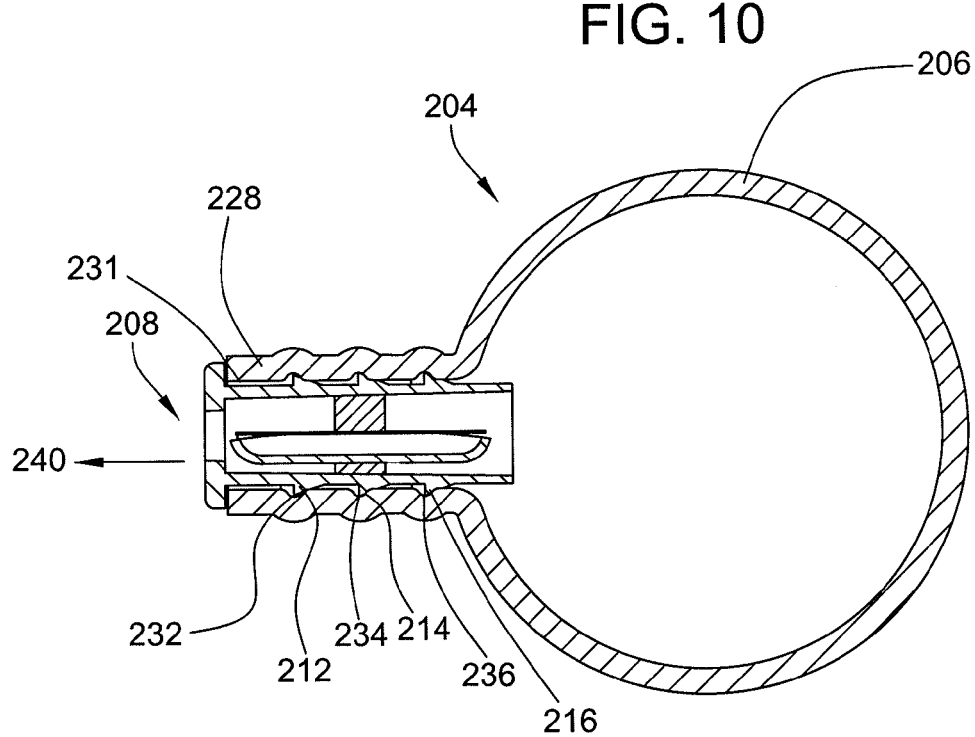
FIG. 10 is a cross-sectional view of the bladder assembly taken along line 10-10 in FIG. 8.
Figure 11:
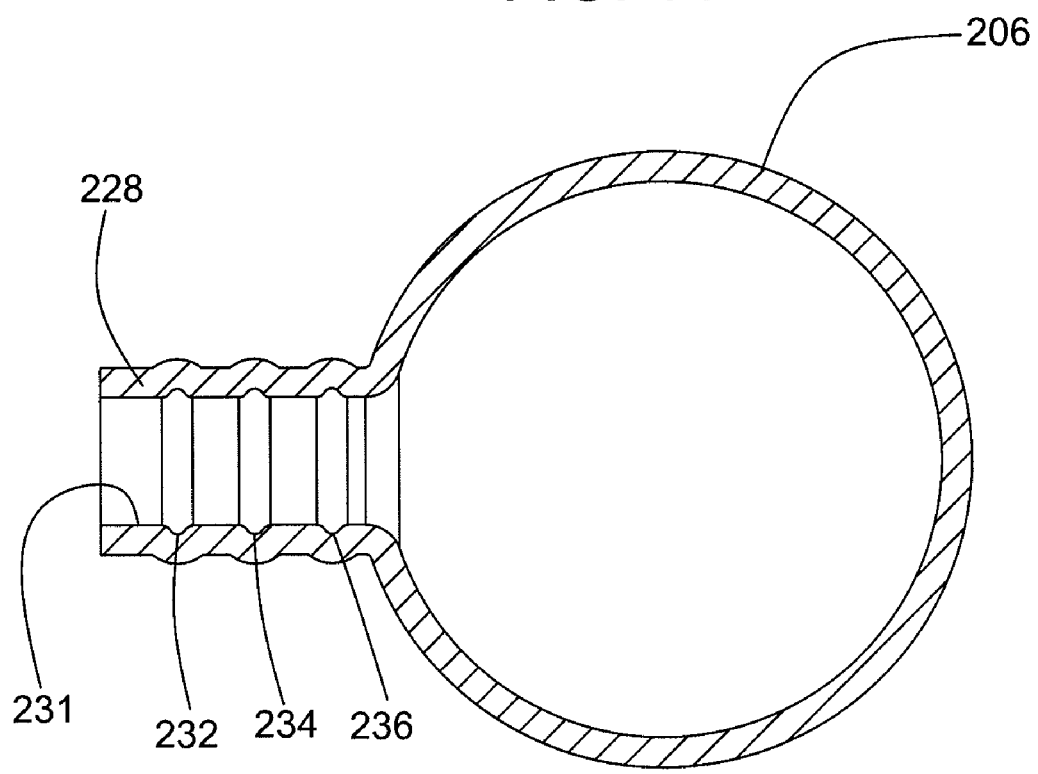
FIG. 11 is a cross-sectional view of a bladder.

Referring to FIGS. 8-11, another embodiment of a bladder assembly is shown. The bladder assembly 204 may be similar to bladder assembly 104 except that the bladder 206 may include three grooves 232, 234, 236. Referring to FIG. 10, the neck 228 may have a first groove 232, a second groove 234, and a third groove 236. The rib 212 may engage the groove 232. The rib 214 may engage the groove 234. The rib 216 may engage the groove 236. The engagement of the ribs 212, 214, 216 with the grooves 232, 234, 236 may prevent the squeaker assembly 208 from exiting the opening 231 of the bladder in the direction 240 when the bladder 206 is compressed. If the rib 212 did disengage the groove 232, the rib 214 may engage the groove 232 and the rib 216 may engage the groove 234 to prevent the squeaker assembly 208 from exiting the opening 231 in the direction 240 when the bladder 206 is compressed. If the rib 214 did disengage the groove 232, the rib 216 may engage the groove 232 to prevent the squeaker assembly 208 from exiting the opening 231 in the direction 240 when the bladder 206 is compressed.

The ribs 212, 214, 216 may have any of shapes described herein, as appropriate. The grooves 232, 234, 236 may have any of the shapes described herein, as appropriate. The bladder 206 may have any of the shapes and/or materials as described herein, as appropriate. The squeaker assembly 208 may be any of the squeaker assemblies described herein, as appropriate. The bladder and/or the squeaker assembly may have any of the dimensional information as described herein, as appropriate.

Figure 12:
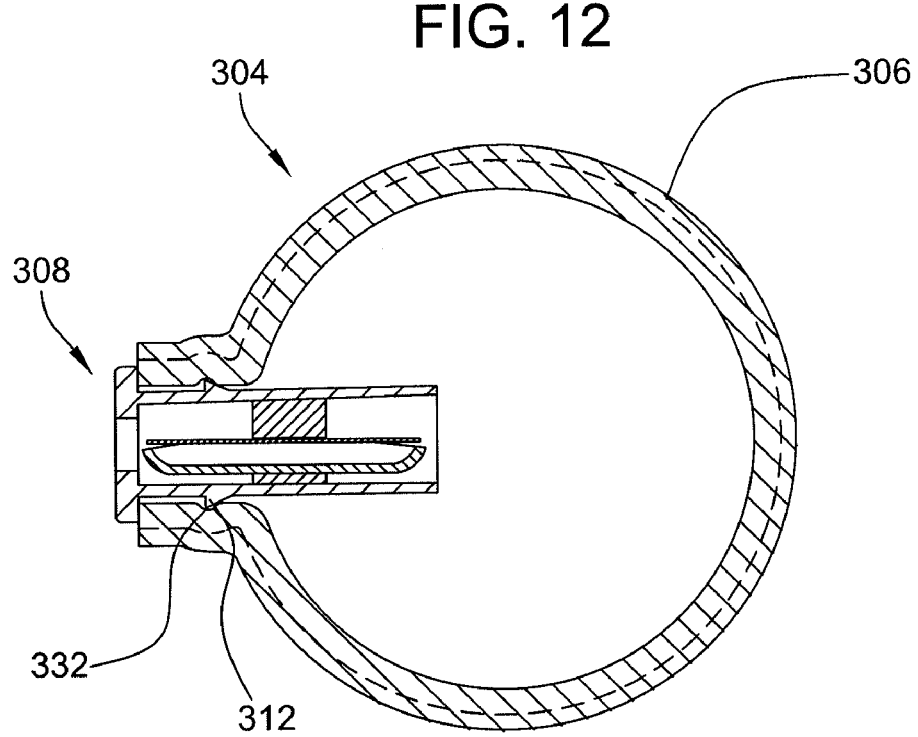
FIG. 12 is a cross-sectional view of another embodiment of a bladder assembly.

Referring to FIG. 12, another embodiment of a bladder assembly is shown. The bladder assembly 304 may be similar to bladder assembly 104 except that the squeaker assembly 308 may have one rib 312. The rib 312 may engage the groove 332 as described herein. The rib 312 may have any of shapes described herein, as appropriate. The groove 332 may have any of the shapes described herein, as appropriate. The bladder 306 may have any of the shapes and/or materials as described herein, as appropriate. The squeaker assembly 308 may be any of the squeaker assemblies described herein, as appropriate. The bladder and/or the squeaker assembly may have any of the dimensional information as described herein, as appropriate.

Figure 13:
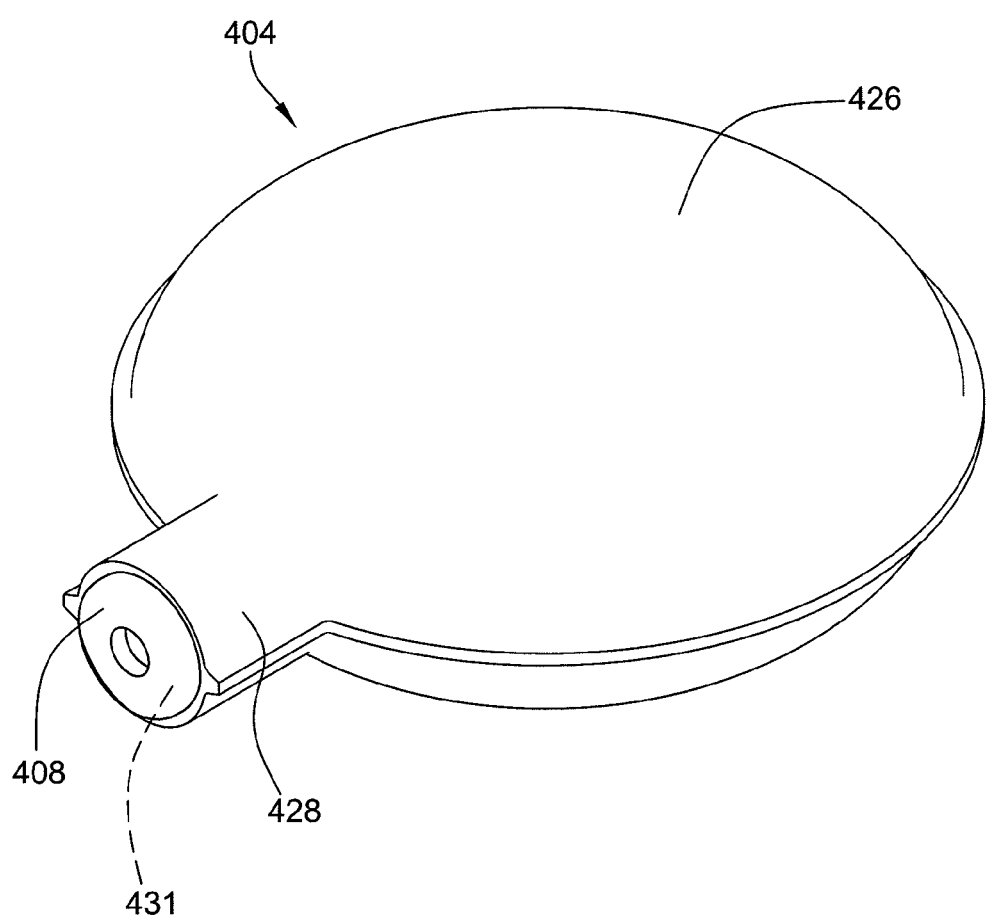
FIG. 13 is a perspective view of another embodiment of a bladder assembly.
Figure 14:
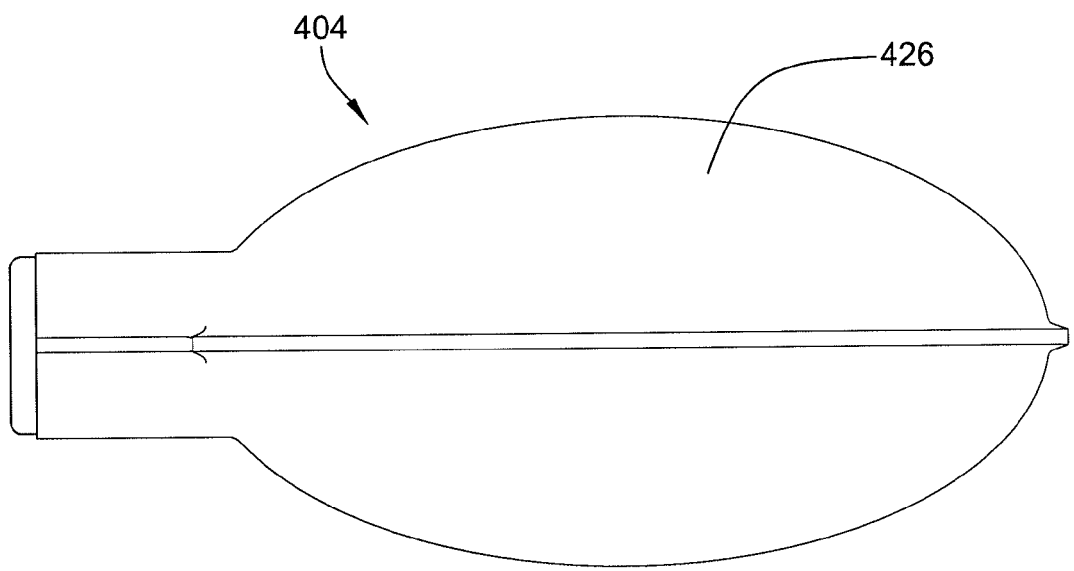
FIG. 14 is a side view of the embodiment in FIG. 13.
Figure 15:
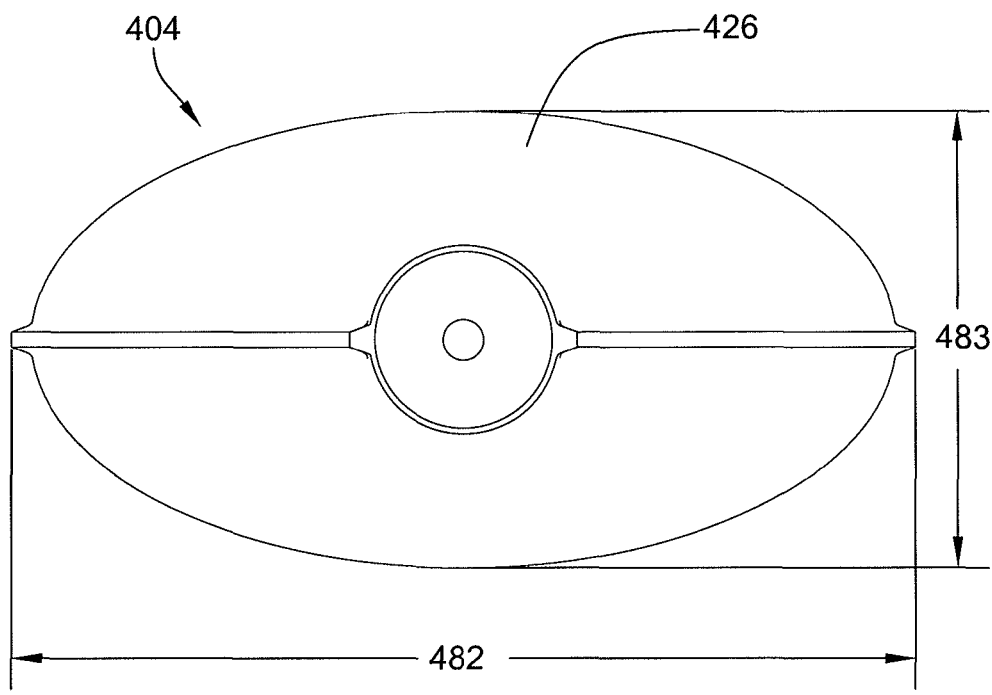
FIG. 15 is a front view of the embodiment in FIG. 13.

Referring to FIGS. 13-15, another embodiment of a bladder assembly is shown. The bladder assembly 404 may be similar to bladder assembly 104 except that the body 426 may have an oblate spherical or flattened spherical shape. The squeaker assembly 408 may have one, two or three ribs. The rib(s) may have any of shapes described herein, as appropriate. The bladder 406 may have one, two, or three grooves. The groove(s) may have any of the shapes described herein, as appropriate. The bladder 406 may have any of the shapes and/or materials as described herein, as appropriate. The squeaker assembly 408 may be any of the squeaker assemblies described herein, as appropriate. The opening 431 and/or the squeaker assembly 408 may have any of the dimensional information as described herein, as appropriate.

The body 426 may have a distance 482. The distance 482 may have a first range from about 1.35 inches (3.43 cm) to about 1.9 inches (4.83 cm), a second range from about 1.4 inches (3.56 cm) to about 1.8 inches (4.57 cm), and a third range from about 1.5 inches (3.81 cm) to about 1.7 inches (4.32 cm). In a first embodiment, the distance 482 may be 1.5 inches (3.81 cm). In a second embodiment, the distance 482 may be 1.52 inches (3.86 cm).

The body 426 may have a distance 483. The distance 483 may have a first range from about 0.6 inches (1.52 cm) to about 1.1 inches (2.79 cm), a second range from about 0.7 inches (1.78 cm) to about 1 inch (2.54 cm), and a third range from about 0.8 inches (2.03 cm) to about 0.9 inches (2.29 cm). In a first embodiment, the distance 483 may be 0.8 inches (2.03 cm). In a second embodiment, the distance 482 may be 0.84 inches (2.13 cm).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A bladder assembly for a pet toy comprising a bladder and a squeaker assembly, the bladder includes a body and a neck, the neck includes an opening, the squeaker assembly includes a first rib, the first rib is a raised portion, the first rib is positioned within the body.

2. The bladder assembly as in claim 1 wherein the squeaker assembly includes a second rib.

3. The bladder assembly as in claim 2 wherein the second rib is positioned within the body.

4. The bladder assembly as in claim 3 wherein the squeaker assembly includes a third rib.

5. The bladder assembly as in claim 4 wherein the third rib is positioned in the neck.

6. The bladder assembly as in claim 5 wherein the opening includes a groove, the third rib engages the groove.

7. The bladder assembly as in claim 2 wherein the second rib is positioned within the neck.

8. The bladder assembly as in claim 7 wherein the opening includes a groove, the second rib engages the groove.

9. The bladder assembly as in claim 1 wherein the body is made of a material, the material is selected from the group consisting of urethane, polypropylene (PP), low density polypropylene (LDPP), polyvinyl chloride (PVC), elastomers, or a combination thereof.

10. The bladder assembly as in claim 1 wherein the squeaker assembly includes a reed.

11. The bladder assembly as in claim 1 wherein the squeaker assembly includes a stop.

12. The bladder assembly as in claim 1 wherein the squeaker assembly includes a barrel, the first rib is located on the barrel.

13. The bladder assembly as in claim 1 wherein the body has a spherical shape.

14. The bladder assembly as in claim 1 wherein the body has a flattened spherical shape.

15. The bladder assembly as in claim 1 wherein the neck extends outward from the body.

16. A bladder assembly for a pet toy comprising a bladder and a squeaker assembly, the bladder includes a body and a neck, the neck includes an opening, the squeaker assembly includes a first rib, the first rib is positioned within the body, the squeaker assembly includes a second rib, the second rib is positioned within the body.

17. The bladder assembly as in claim 16 wherein the squeaker assembly includes a third rib.

18. The bladder assembly as in claim 5 wherein the third rib is positioned in the neck.

19. The bladder assembly as in claim 18 wherein the opening includes a groove, the third rib engages the groove.

20. The bladder assembly as in claim 16 wherein the body is made of a material, the material is selected from the group consisting of urethane, polypropylene (PP), low density polypropylene (LDPP), polyvinyl chloride (PVC), elastomers, or a combination thereof.

21. The bladder assembly as in claim 16 wherein the squeaker assembly includes a reed.

22. The bladder assembly as in claim 16 wherein the squeaker assembly includes a stop.

23. The bladder assembly as in claim 16 wherein the squeaker assembly includes a barrel, the first rib is located on the barrel.

24. The bladder assembly as in claim 16 wherein the body has a spherical shape.

25. The bladder assembly as in claim 16 wherein the body has a flattened spherical shape.

26. The bladder assembly as in claim 16 wherein the neck extends outward from the body.

27. A bladder assembly for a pet toy comprising a bladder and a squeaker assembly, the bladder includes a body and a neck, the neck includes an opening, the squeaker assembly includes a first rib, the first rib is positioned within the body, the squeaker assembly includes a second rib, and the second rib is positioned within the neck.

28. The bladder assembly as in claim 27 wherein the opening includes a groove, the second rib engages the groove.

29. The bladder assembly as in claim 27 wherein the squeaker assembly includes a third rib.

30. The bladder assembly as in claim 27 wherein the body is made of a material, the material is selected from the group consisting of urethane, polypropylene (PP), low density polypropylene (LDPP), polyvinyl chloride (PVC), elastomers, or a combination thereof.

31. The bladder assembly as in claim 27 wherein the squeaker assembly includes a reed.

32. The bladder assembly as in claim 27 wherein the squeaker assembly includes a stop.

33. The bladder assembly as in claim 27 wherein the squeaker assembly includes a barrel, the first rib is located on the barrel.

34. The bladder assembly as in claim 27 wherein the body has a spherical shape.

35. The bladder assembly as in claim 27 wherein the body has a flattened spherical shape.

36. The bladder assembly as in claim 27 wherein the neck extends outward from the body.

* * * * *

UNITED STATES PATENT AND TRADEMARK OFFICE
CERTIFICATE OF CORRECTION

| | | |
|---|---|---|
| PATENT NO. | : 7,950,352 B2 | |
| APPLICATION NO. | : 12/549215 | |
| DATED | : May 31, 2011 | |
| INVENTOR(S) | : Paul B. Specht | |

It is certified that error appears in the above-identified patent and that said Letters Patent is hereby corrected as shown below:

Column 7, line 39, in claim 18, "as in claim 5" should be --as in claim 17--.

Signed and Sealed this
Eleventh Day of December, 2012

David J. Kappos
*Director of the United States Patent and Trademark Office*